May 5, 1959 W. A. PATTERSON 2,885,199
APPARATUS FOR FEEDING AND HEATING FINELY DIVIDED MATERIALS
Filed Oct. 5, 1955 2 Sheets-Sheet 1
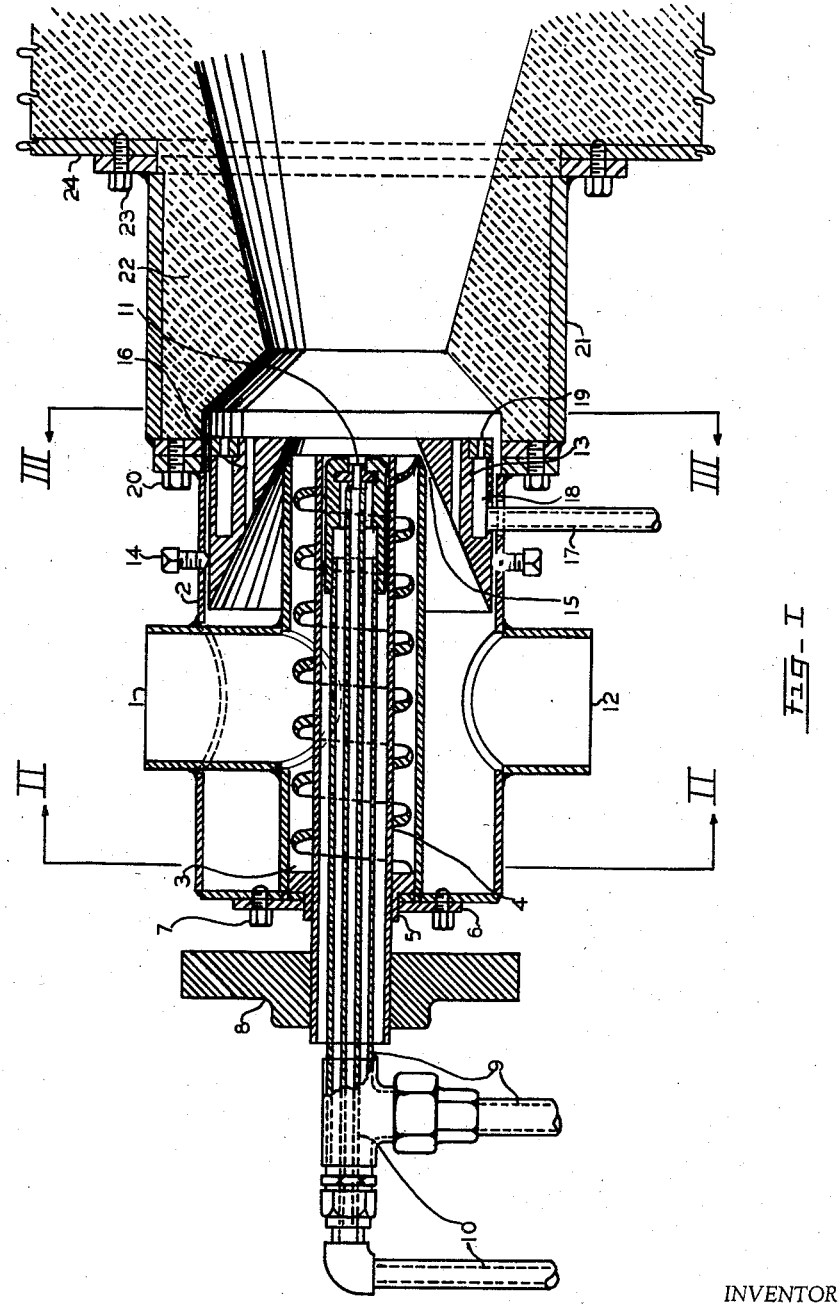
INVENTOR
WILLIAM A. PATTERSON
BY
ATTORNEY May 5, 1959 W. A. PATTERSON 2,885,199
APPARATUS FOR FEEDING AND HEATING FINELY DIVIDED MATERIALS
Filed Oct. 5, 1955 2 Sheets-Sheet 2
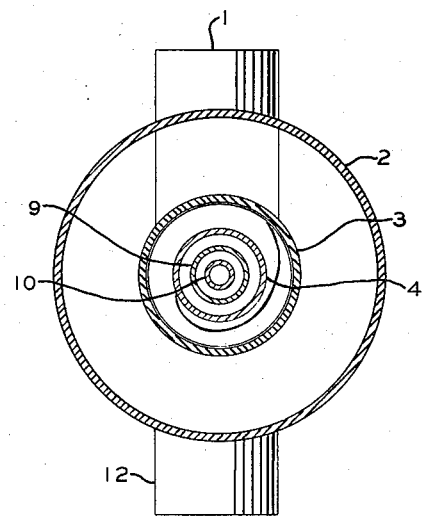
Fig. II
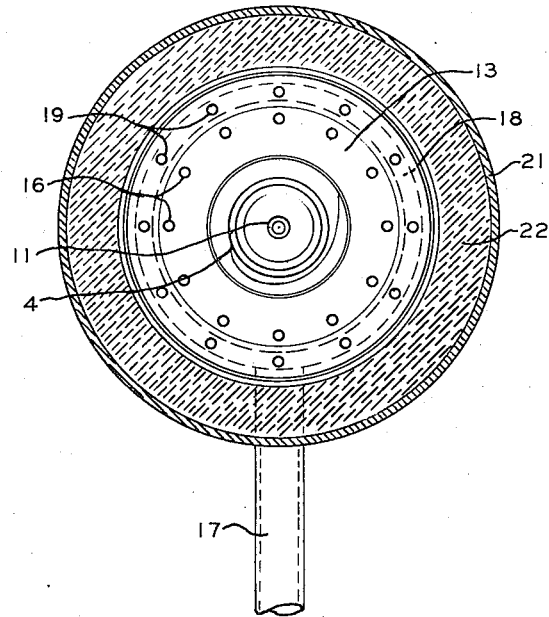
Fig. III
INVENTOR
WILLIAM A. PATTERSON
BY Lloyd F. Engle, Jr.
ATTORNEY

2,885,199

APPARATUS FOR FEEDING AND HEATING FINELY DIVIDED MATERIALS

William A. Patterson, Washington, Pa., assignor to Fort Pitt Bridge Works, Pittsburgh, Pa., a corporation of Pennsylvania Application October 5, 1955, Serial No. 538,581

4 Claims. (Cl. 266—20)

This invention pertains to method and apparatus for rapidly imparting a high initial heat to the particles of a finely divided material. More particularly this invention relates to the method of continuously presenting finely divided materials to a heat source and propelling the said particles of material, with or without carbonaceous material, around and within the said heat source into a treating or roasting furnace and to the feeding and heating apparatus for carrying out such a method.

The method and apparatus covered by the following description and the appended claims may be employed in the treatment of a broadly divergent class of materials of both the metallic and non-metallic type, but its most apparent utility is to be found in the treatment of metallic ores.

The apparatus and methods in prior use for imparting initial heat to ores have fundamentally comprised dropping or propelling the ores through a flame or heated gases or through the radiant heat of a reverberatory type furnace. The inability to impart sufficient heat to the ores treated in such apparatus was due basically to inefficiency of the heat source and the relatively short period during which the ore was presented thereto. Under conditions where effort was made to preserve the ore in proximity to the heat source for longer periods the resultant structure became unduly high and large. In other apparatus where the ore passed through the heat source directly into a molten bath, the chemical change in the ore, which occurs in the practice of the well known art of roasting or reducing ores slowly, was prematurely terminated and the objectionable materials inherent in the ores were carried into the molten mass instead of being driven off or separated by the practice of the aforesaid well known art.

I have observed that the process of roasting or reducing ores is greatly facilitated and shortened if a high initial heat is imparted to the said ores. Therefore it is essential to utilize a highly efficient heat source which preserves the ore in proximity to the said heat source for a period of sufficient length to heat the said ore to the proper roasting or reduction temperature but not so long as to melt it or to cause the gangue to become plastic.

Virtually all of the metallic ores which are industrially treated, as by roasting or reducing, are possessed of a relatively high specific heat, and therefore resist the imparting of heat to them. Since the said ores are susceptible of the desired chemical change at variant high temperatures, it is important that they should be brought to those temperatures as quickly as possible so that the said chemical change may commence without delay.

Therefore, one object of this invention is to provide a highly efficient heat source to raise the temperature of the materials rapidly while limiting the consumption of fuel therein to a minimum. A further object of this invention is to provide a means for continuously feeding and heating the said materials, with or without carbonaceous material, which can be simply adjusted and accommodated to produce the variant results necessary for different materials and different qualities of the same material. A still further object of this invention is to provide a highly efficient heat source for raising the temperature of materials being treated as aforesaid, while at the same time imparting its residual heat to a treating or roasting furnace to preserve the desired temperature therein. Further and additional objects will appear from the following description and the appended claims.

Briefly to describe the primary features of a feeding and heating apparatus embodying my invention, I provide a fundamentally tubular or cylindrical chamber or housing having non-rotatably mounted therein an additional cylindrical housing in concentrically non-engaging spaced relation thereto. Within the internal cylindrical housing, an externally rotatable hollow helical screw is mounted in peripheral engagement therewith, and extending through the said helical screw a fuel supply pipe and nozzle are non-rotatably mounted in concentrically non-engaging spaced relation thereto. A supply pipe for combustion-supporting gas, such as compressed air or oxygen, is mounted within the fuel supply pipe in concentrically non-engaging spaced relation thereto and extends longitudinally through the said fuel supply pipe to the said nozzle. An adjustable ring, having a beveled inner periphery in the form of a truncated cone, surrounds the inward termini of the internal cylindrical housing, the helical screw and the nozzle, and has an annular fuel duct and connecting ports within its body. The component parts of the structure thus formed have a coincidental longitudinal center line.

Fig. I is a longitudinal cross-sectional view through my feeding and heating apparatus.

Fig. II is a cross-sectional view through my feeding and heating apparatus taken in the plane of section line II—II of Fig. I.

Fig. III is a cross-sectional view through my feeding and heating apparatus taken in the plane of section line III—III of Fig. I.

Referring to the drawings, the numeral 1 indicates an inlet for the finely divided material to be treated with or without finely divided carbonaceous material. The said inlet 1 passes through the external cylindrical housing 2 and connects with the internal cylindrical housing 3. A hollow helical screw 4, mounted within the internal housing 3, is rotatably secured by a thrust bearing 5 which is held in place by thrust plate 6 being non-rotatably engaged to the external housing 2 by means of screws 7. The helical screw 4 is engaged to a gear or sprocket 8 which is rotatably driven by a conventional variable speed motor (not shown in the drawings). The primary fuel supply pipe 9 surrounds the combustion-supporting gas supply pipe 10 and this combination extends longitudinally through the hollow helical screw 4 terminating at its inward extremity in the burner nozzle 11 where the primary combustion occurs within the ring of finely divided materials projected by the helical screw 4. The numeral 12 indicates an inlet for the secondary fuel into the external housing 2. The ring 13 is adjustably mounted in the external housing 2 by means of set screws 14 and the beveled inner periphery of the said ring 13 cooperates with the inward extremity of the internal housing 3 to form an adjustable annular port 15 for the secondary fuel supply which produces part of the secondary combustion in the area immediately surrounding the ring of finely divided materials projected by the helical screw 4. Ports 16 pierce the ring 13 in a circular pattern and conduct the remainder of the secondary fuel to their inward terminus where the residual secondary combustion occurs. The numeral 17 indicates an inlet for the tertiary fuel supply into the annular duct 18 within the ring 13. The annular duct 18 communicates with ports 19 arranged in a circular pattern in the ring 13 which conduct the tertiary fuel to their inward terminus where the tertiary combustion occurs.

The entire structure so constituted is engaged by means of screws 20 to a combustion tunnel 21 which is lined with a ceramic material 22. Screws 23 engage the combustion tunnel 21 to the furnace casing 24.

The apparatus may be modified by blocking off either the tertiary fuel inlet 17 or the secondary fuel ports 16 or both in the ring 13 to effect a conservation of fuel during operations wherein the additional heat therefrom is not required. This constitutes an important feature of the novelty and utility of the apparatus embodying my invention for the reason that its versatility is extended thereby to permit the economic and efficient processing of a greater variety of materials.

In operation, the finely divided materials comprising the material to be treated and carbonaceous material or simply the material to be treated alone, depending upon the process being conducted, passes through the inlet 1 to the internal housing 3 where it is thrust toward the inward extremity of the said housing 3 by means of the helical screw 4. Oil or fuel gas is conducted through the primary fuel supply pipe 9 and the combustion supporting gas, comprising oxygen or compressed air and oxygen, is conducted through the supply pipe 10 to the nozzle 11 where the primary combustion occurs within the ring of finely divided material presented by the said screw 4. The secondary fuel, comprising fuel gas or air and fuel gas, enters the external housing 2 through inlet 12 and is expelled through the annular port 15 and the ports 16 to create the secondary combustion in the form of an enveloping cylinder surrounding the ring of finely divided material presented by the said screw 4. In some instances of operation, where the material being treated possesses a high inherent resistance to the imparting of heat thereto, the tertiary fuel comprising fuel gas or air and fuel gas is introduced through inlet 17 into the annular duct 18 within the ring 13 and passes through the ports 19 to create the tertiary combustion in the form of an additional enveloping cylinder surrounding the secondary combustion area. When the finely divided material has been thrust to the inward extremity of the internal housing 3 and the helical screw 4 the ring of the said material is no longer supported and disintegrates, whereupon the particles of the said material are borne by the hot gaseous products of combustion in the several combustion zones and propelled therewith through the combustion tunnel and into the treating or roasting furnace chamber.

An important feature of the novelty of my invention is found in the arrangement of the structure comprising means for presenting the finely divided material in the shape of a ring to the several phases of combustion occurring within and around the said ring of material and the propulsion of the particles of the said finely divided material through a combustion tunnel and into a treating or roasting furnace, during which propulsion the said particles are maximally exposed to the hot gaseous products of combustion throughout their entire trajectory.

An additional important feature is found in the flexibility and versatility of operation of the apparatus comprising widely variant conditions of combustion and rates of feed to accommodate the processing of different materials possessing a broad scope of characteristics.

I have operated the apparatus embodying my invention successfully in the treatment of iron ore of the type known as hematite or $Fe_2O_3$ mixed with coke. The ore ranged from approximately 50% passing a 300 mesh up to particles passing a ¼ inch mesh and the coke was composed of particles passing a ¼ inch mesh. The jet of primary fuel comprising compressed air and oil along with the secondary fuel comprising gas and air at 15 ounce fan pressure bore up the particles of material at the inward extremity of the burner and propelled them into the treating furnace at the rate of approximately 12 pounds per minute, and after one (1) hour of continuous feeding, a temperature reading taken on the charged material was observed to be 1970° F. During this hour of continuous feeding, 730 pounds of ore and coke were charged and the fuel consumption showed that 840,000 B.t.u.'s of heat were produced. On practically identical charges heated to approximately the same temperature by apparatus and methods in prior use in the art, the recorded fuel consumption showed that approximately 2,000,000 B.t.u.'s of heat were produced.

I have also operated the apparatus embodying my invention successfully in the treatment of molybdenum ore containing from 88% to 95% molybdenum disulphide ($MoS_2$). The ore which all passed a 100 mesh and contained approximately 5% moisture was fed, without other material, at the rate of 350 pounds per hour. Fuel gas at a pressure of 5 ounces and air at a fan pressure of 6¾ ounces bore up the particles of the ore at the inward extremity of the burner and propelled them into the treating furnace, and the apparatus maintained the temperature of the treating furnace at 1200° F. After one (1) hour of charging the ore in this manner the heating and feeding were stopped and the material allowed to cool to 100° F. Upon analysis it was found that the sulphur content had been reduced from 35% to 1.24%, and upon a practical repetition of the process reusing the treated material, the sulphur content was reduced from 1.24% to 0.178%, thereby furnishing technical molybdic oxide.

As the word "air" is used herein it should be considered to include not only atmospheric air but any mixed gas which contains an adequate proportion of oxygen available for combustion as in the form of $O_2$ or CO.

In practical application the method and apparatus embodying my invention may be employed in multiple installation on a treating or roasting furnace, thereby increasing its productivity to whatever extent may be desired for commercial production.

Certain changes may be made in the arrangement set forth in the specification and shown in the drawings, it being understood that modifications in the precise embodiment of the invention may be made within the scope of the following claims without departing from the spirit of the invention.

I claim as my invention:

1. A device for feeding and heating finely divided materials, comprising a cylindrical housing having an inlet for finely divided materials therein, a hollow helical screw rotatably mounted therein in a concentric relation thereto which cooperates with external mechanical rotative means, a fuel supply pipe mounted within the said screw in a concentric spaced relation thereto, a supply pipe for combustion supporting gas mounted within the said fuel supply pipe in a concentric spaced relation thereto, and a burner nozzle mounted on the said fuel supply pipe and the supply pipe for combustion supporting gas which projects combustion gases longitudinally in the direction of travel of the said materials, the discharge end of the said burner nozzle being substantially at the discharge extremity of the said screw.

2. A device for feeding and heating finely divided materials, comprising an internal cylindrical housing having an inlet for finely divided materials therein, a hollow helical screw rotatably mounted therein in a concentric relation thereto which cooperates with external mechanical rotative means, a fuel supply pipe mounted within the said screw in a concentric spaced relation thereto, a supply pipe for combustion supporting gas mounted within the said fuel supply pipe in a concentric spaced relation thereto, a burner nozzle mounted on the said fuel supply pipe and the supply pipe for combustion supporting gas which projects combustion gases longitudinally in the direction of travel of the said materials, the discharge end of the said burner nozzle being substantially at the discharge extremity of the said screw, an external housing having inlets therein including at least one inlet for secondary combustion fuel, and an internally beveled ring adjustably mounted in concentric engagement with the said external housing and cooperating internally with the said internal housing to form an inclined annular orifice for the said secondary combustion fuel, the said orifice being substantially at the discharge extremity of the said screw.

3. A device for feeding and heating finely divided materials, comprising an internal cylindrical housing having an inlet for finely divided materials therein, a hollow helical screw rotatably mounted therein in a concentric relation thereto which cooperates with external mechanical rotative means, a fuel supply pipe mounted within the said screw in a concentric spaced relation thereto, a supply pipe for combustion supporting gas mounted within the said fuel supply pipe in a concentric spaced relation thereto, a burner nozzle mounted on the said fuel supply pipe and the supply pipe for combustion supporting gas which projects combustion gases longitudinally in the direction of travel of the said materials, the discharge end of the said burner nozzle being substantially at the discharge extremity of the said screw, an external housing having inlets therein including at least one inlet for secondary combustion fuel, an internally beveled ring adjustably mounted in concentric engagement with the said external housing and cooperating internally with the said internal housing to form an inclined annular orifice for the said secondary combustion fuel, the said orifice being substantially at the discharge extremity of the said screw, and ports through the said ring to conduct additional secondary combustion fuel therethrough.

4. A device for feeding and heating finely divided materials, comprising an internal cylindrical housing having an inlet for finely divided materials therein, a hollow helical screw rotatably mounted therein in a concentric relation thereto which cooperates with external mechanical rotative means, a fuel supply pipe mounted within the said screw in a concentric spaced relation thereto, a supply pipe for combustion supporting gas mounted within the said fuel supply pipe in a concentric spaced relation thereto, a burner nozzle mounted on the said fuel supply pipe and the supply pipe for combustion supporting gas which projects combustion gases longitudinally in the direction of travel of the said materials, the discharge end of the said burner nozzle being substantially at the discharge extremity of the said screw, an external housing having inlets therein including at least one inlet for secondary combustion fuel and one inlet for tertiary combustion fuel, an internally beveled ring adjustably mounted in concentric engagement with the said external housing and cooperating internally with the said internal housing to form an inclined annular orifice for the said secondary combustion fuel, the said orifice being substantially at the discharge extremity of the said screw, ports through the said ring to conduct additional secondary combustion fuel therethrough, and an internal annular duct within the said ring communicating with ports therein for the said tertiary combustion fuel.

References Cited in the file of this patent
UNITED STATES PATENTS

| | | |
|---|---|---|
| 1,073,462 | Banes | Sept. 16, 1913 |
| 1,350,419 | Morrison | Aug. 24, 1920 |
| 2,315,123 | Lohse | Mar. 30, 1943 |
| 2,413,434 | Cottrell | Dec. 31, 1946 |
| 2,429,372 | Savage | Oct. 21, 1947 |